(12) United States Patent
Robertson et al.

(10) Patent No.: US 8,743,708 B1
(45) Date of Patent: *Jun. 3, 2014

(54) DEVICE AND METHOD SUPPORTING COGNITIVE, DYNAMIC MEDIA ACCESS CONTROL

(75) Inventors: Richard L. Robertson, Cedar Rapids, IA (US); Robert J. Frank, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1087 days.

This patent is subject to a terminal disclaimer.

(21) Appl. No.: 11/194,782

(22) Filed: Aug. 1, 2005

(51) Int. Cl.
*G01R 31/08* (2006.01)

(52) U.S. Cl.
USPC .......................................... 370/252

(58) Field of Classification Search
USPC ......... 370/389, 338, 349, 465, 466, 469, 345, 370/252; 455/561; 342/357.1
See application file for complete search history.

(56) References Cited

U.S. PATENT DOCUMENTS

| | | | |
|---|---|---|---|
| 6,400,962 B1 | 6/2002 | Yamada | |
| 6,522,650 B1 * | 2/2003 | Yonge et al. | 370/390 |
| 6,771,957 B2 * | 8/2004 | Chitrapu | 455/423 |
| 6,853,852 B1 * | 2/2005 | Park et al. | 455/561 |
| 6,965,639 B2 | 11/2005 | Uesugi | |
| 7,043,252 B2 | 5/2006 | Khitrik et al. | |
| 7,277,492 B2 | 10/2007 | Itoh | |
| 7,289,972 B2 * | 10/2007 | Rieser et al. | 706/13 |
| 7,336,602 B2 | 2/2008 | Silvester | |
| 2002/0085532 A1 | 7/2002 | Kim | |
| 2002/0089935 A1 * | 7/2002 | Chan et al. | 370/252 |
| 2004/0180697 A1 | 9/2004 | Lee et al. | |
| 2004/0259585 A1 | 12/2004 | Yitzchak et al. | |
| 2005/0022143 A1 | 1/2005 | Butts et al. | |
| 2005/0058153 A1 | 3/2005 | Santhoff et al. | |
| 2005/0198219 A1 | 9/2005 | Banerjee et al. | |
| 2008/0259895 A1 * | 10/2008 | Habetha et al. | 370/345 |
| 2009/0010268 A1 | 1/2009 | Giacomazzi et al. | |
| 2010/0156706 A1 * | 6/2010 | Farmer et al. | 342/357.1 |

OTHER PUBLICATIONS

Richard Robertson, Claims of App. 11/194868.*
Demestichas, et al., "Issues in the Introduction of Reconfigurability in Wireless B3G Environments," printed from website http://e2r.motlabs.com/dissemination/conferences/E2R_SDRFO4_WWRF.pdf on Jul. 29, 2005.

(Continued)

*Primary Examiner* — Mark Rinehart
*Assistant Examiner* — Gbemileke Onmauti
(74) *Attorney, Agent, or Firm* — Donna P. Suchy; Daniel M. Barbieri

(57) ABSTRACT

A method and a device for reconfiguring communication transmission characteristics in response to a changing communication environment is provided. An environment at a communication device is characterized to determine if a transmission parameter associated with processing of a communication signal at a physical layer or a network interface layer should change based on current conditions at the communication device. If a need is identified, a second transmission parameter is selected based on the environment monitoring. A request identifying the second transmission parameter is sent to a second communication device using an existing communication link. A response from the second communication device is received indicating acceptance or rejection of use of the second transmission parameter. If the response indicates acceptance of use of the second transmission parameter, the physical layer and/or the network interface layer are reconfigured based on the selected second transmission parameter.

20 Claims, 5 Drawing Sheets

(56) References Cited

OTHER PUBLICATIONS

Marshall, "It May be Network Centric, But It's the Edge that Needs the Technology!," Defense Advanced Research Projects Agency, Federal Computer Week $2^{nd}$ Wireless Conference and Exhibition, Mar. 2, 2005, p. 1-32.

Dimitrakopoulos, et al., "Cognitive Radio, Spectrum and Radio Resource Managmenet," Wireless World Research Forum, 2004.

Office Action for U.S. Appl. No. 11/194,868, mail date Sep. 7, 2010, 21 pages.

Office Action for U.S. Appl. No. 11/194,868, mail date Feb. 11, 2011, 14 pages.

* cited by examiner

DEVICE AND METHOD SUPPORTING COGNITIVE, DYNAMIC MEDIA ACCESS CONTROL

CROSS REFERENCE TO RELATED APPLICATIONS

This application relates to U.S. patent application Ser. No. 11/194,779, entitled "CONTROL OF RECONFIGURABLE SIS/MAC PROTOCOLS USED IN WIRELESS COMMUNICATION DEVICES", and having inventors Richard L. Robertson and Robert J. Frank. This application additionally relates to U.S. patent application Ser. No. 11/194,868, entitled "DEVICE AND METHOD SUPPORTING COGNITIVE MEDIA ACCESS CONTROL", and having inventors Richard L. Robertson and Robert J. Frank. This application further relates to U.S. patent application Ser. No. 11/194,793, entitled "SYSTEM AND METHOD TO SUPPORT COMMUNICATION BETWEEN NON-COGNITIVE RADIOS AND COGNITIVE RADIOS", and having inventors Richard L. Robertson, Robert J. Frank, and Wayne A. Kraus.

FIELD OF THE INVENTION

The subject of the disclosure relates generally to wireless communication devices. More specifically, the disclosure relates to a device and a method that support cognitive, dynamic media access control.

BACKGROUND

Layering is used to organize programming modules into separate functional components that interact in a sequential and hierarchical way so that each layer has an interface only to the layer above and below it, and thus, no need to understand the processing performed at any of the other layers. Communication programs may be structured in layers such that programming and hardware at both ends of the communication exchange use an identical set of layers. To process a message, data in a first device flows down through each layer and is transmitted through a physical media to a second device. Before reaching the second device, the message may "hop" multiple times between intermediary devices such as routers. The message is received at the second device, and the data flows up through the layers where it is ultimately presented to the user or used in an application at the second device.

A communication stack, for example, may include five layers: 1) a physical (PHY) layer, 2) a network interface layer, 3) an Internet Protocol (IP) layer, 4) a transport layer, and 5) an application layer. The PHY layer, also referred to as the hardware layer, provides the physical components that enable the transmission and reception of bits of information whether analog or digital. Thus, in wireless communications, the PHY layer receives/transmits a signal-in-space (SIS) and, for example, converts bits into pulses or into a modulated carrier waveform. Access to the PHY layer is controlled by the network interface layer.

The network interface layer provides transmission protocol knowledge and management, handles errors in the PHY layer, and provides flow control and frame synchronization. The network interface layer generally is divided into two sub-layers: the logical link control (LLC) sub-layer and the MAC sub-layer. The LLC sub-layer controls frame synchronization, flow control, and error checking. The MAC sub-layer provides transmission protocol knowledge and management thereby controlling how a device gains access to information, acquires the data path, and sends information over the data path. In general, the MAC sub-layer makes sure that devices sharing a common communications channel do not interfere with each other. Access control transmission technologies implemented at the MAC sub-layer include code division multiple access (CDMA), frequency division multiple access (FDMA), time division multiple access (TDMA), global system for mobile communications (GSM), general packet radio services (GPRS), carrier sense multiple access (CSMA), CSMA-collision detection (CSMA-CD), orthogonal frequency division multiplexing (OFDM), Aloha, slotted Aloha, spectrum portable management application (SPMA), Bluetooth, IEEE 802.11, etc.

IP is the method or protocol by which data is sent from one device to another through a network that may include both wired and wireless devices. Each device on the network has at least one IP address that uniquely identifies it from all of the other devices on the network. Originally, the devices were computers that connected to each other using IP through the Internet. Today, the devices that employ IP have expanded to include all types of communication devices including cellular phones, personal digital assistants, radios, etc. Using IP, a message is divided into small chunks called packets that each contain both the sender's IP address and the receiver's IP address. Each packet is treated as an independent unit of data without any relation to any other unit of data. The IP layer handles communication from one device to another device by providing, for example, the routing information that includes the IP addresses. Because a message is divided into a number of independent packets, each packet can, if necessary, be sent by a different route between the sending device and the receiving device. As a result, packets can arrive in a different order than the order in which they were sent.

The transport layer manages the end-to-end control of the data packets. The transport layer may use the user datagram protocol (UDP) or the transmission control protocol (TCP) to collect the packets and pass the packets on to the application layer. UDP passes the packets in the order in which they are received. TCP collects the packets and places the packets in the correct order before passing the packets to the application layer. The applications layer identifies other communication nodes, identifies a quality of service, considers user authentication and privacy, identifies any constraints on data syntax, etc.

To provide maximum bandwidth utilization, future wireless systems must support communication using a wide range of SIS/MAC pairs implemented at the PHY layer and the MAC sub-layer. Current wireless technologies approach this problem by developing stove pipe solutions utilizing a single or multiple slice radio capable of handling separate SIS/MAC pairs. This approach fails to use the available bandwidth and impacts interoperability between wireless devices. Such solutions also fail to provide a low probability of exploitation (LPE) as needed when implementing a clandestine network. Thus, what is needed is a device and a method that provide a separately configurable SIS and MAC for communication between wireless devices.

SUMMARY

An exemplary embodiment of the present invention utilizes cognition applied in connection with selection of separately configurable SIS/MAC protocols to provide improved network performance as compared to an approach relying on static SIS/MAC protocols. Current communication approaches are performed through tuning of static MAC protocols or limited MAC switching. These limitations manifest themselves by the failure to address the growing demand for bandwidth, especially in a network optimized for LPE. Communication devices can expect to encounter a wide array of RF conditions and "companion" waveforms. In this environment, communication channels may consist of one frequency available at 100% duty cycle, or a plurality of frequencies each with a limited duty cycle and an agile hopping structure, or any combination of these conditions. This diverse set of conditions is controlled in combination with one of the various SIS/MAC pairs to ensure optimal channel access. CoD-MAC allows a communication device to transmit a new waveform and allows fast on-the-fly MAC switching (e.g. TDMA to CDMA). For example, a cognitive radio can use different portions of the frequency spectrum as environmental conditions change or the device location changes in addition to switching MAC protocols. As a result, CoDMAC enabled communication networks can establish a communication link by selecting an optimum SIS/MAC pair based on physical conditions at the device and across the local and regional networks.

Cognitive communication devices provide greater bandwidth efficiency across the network with a minimal increase in network overhead by changing frequency, adjusting output power, and/or altering transmission parameters and characteristics. An exemplary embodiment of the present invention permits simultaneous usage approaches for various SIS/MAC implementations such as CDMA, FDMA, TDMA, GSM, GPRS, CSMA, CSMA-CD, OFDM, Aloha, slotted Aloha, SPMA, Bluetooth, IEEE 802.11, etc.

An exemplary embodiment of the invention relates to a method of reconfiguring communication transmission characteristics in response to a changing communication environment. A communication signal is received from a first communication device at a second communication device. An environment at the second communication device is characterized to determine if a transmission parameter associated with processing of the communication signal at a physical layer or a network interface layer of the second communication device should change based on current conditions at the second communication device. If a need is identified, a second transmission parameter is selected based on the environment monitoring. A request identifying the second transmission parameter is sent to the first communication device using an existing communication link. A response from the first communication device is received indicating acceptance or rejection of use of the second transmission parameter. If the response indicates acceptance of use of the second transmission parameter, the physical layer and/or the network interface layer at the second communication device are reconfigured based on the selected second transmission parameter.

Another exemplary embodiment of the invention includes computer-readable instructions that, upon execution by a processor, cause the processor to implement the operations of the method. Yet another exemplary embodiment of the invention includes a communication device having a computer readable media that implements the operations of the method.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION

The goal of devices implementing CoDMAC is to provide greater bandwidth efficiency across the network with a minimal increase in network overhead. To support this capability, the device hardware should be capable of monitoring a wideband radio frequency (RF) spectrum and of transmitting and receiving flexibly within that RF spectrum. As a result, cognitive devices support multiple frequencies and/or can change transmission parameters/characteristics, for example, through use of separately configurable SIS and MAC combinations. Software and protocols support hardware selection of the SIS/MAC combination that provides the optimum bandwidth utilization based on use of a single or multiple frequencies and of the access control transmission technology. Cognitive software supports real-time or near-real-time selection of the SIS/MAC configuration enabling effective and timely response to the changing RF spectrum as the communication device moves and/or environmental conditions change.

Figure 1:
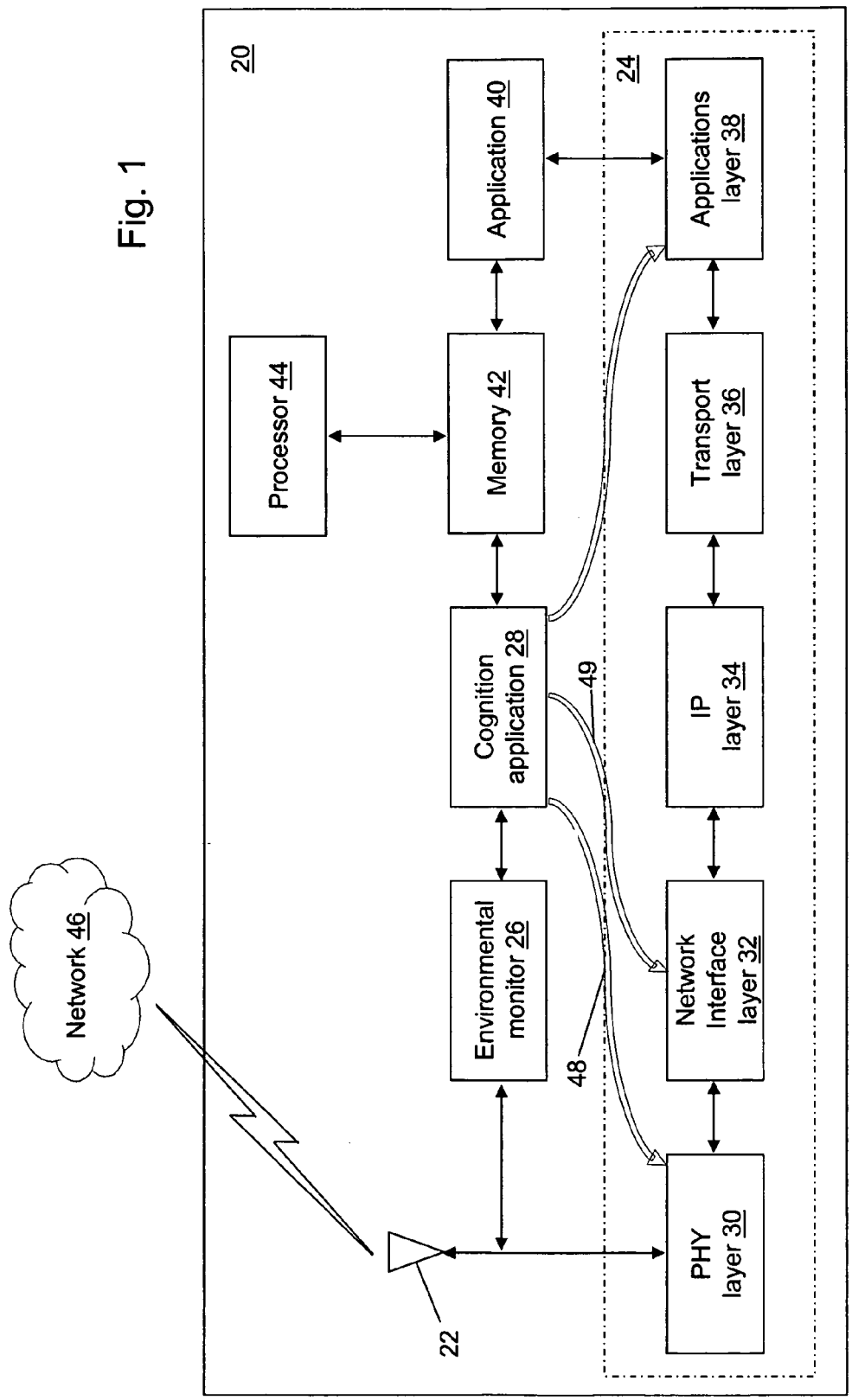
FIG. 1 is a block diagram of a cognitive communication device in accordance with an exemplary embodiment.

With reference to FIG. 1, a communication device 20 is shown. Communication device 20 supports a rapid change to the separately configurable SIS and/or MAC combinations used to transmit/receive a wireless communication signal to/from a network 46. Communication device 20 may include a transceiver antenna 22, a communication stack 24, an environment monitor 26, and a cognition application 28. Communication device 20 may provide communication capabilities across the entire communication spectrum or across only a portion of the spectrum utilizing a variety of access control transmission technologies including various modulation schemes.

In operation, a communication signal is received by transceiver antenna 22, sent up communication stack 24 to extract data/voice information from the communication signal, and the information is received at an application 40 generally through a socket. Similarly, communication stack 24 receives information from the application 40, the information is sent down communication stack 24 forming the communication signal that is transmitted from transceiver antenna 22. In an alternative embodiment, communication device 20 may include separate transmit and receive antennas. Different and additional components may be utilized by communication device 20. For example, communication device 20 includes one or more power source that may be a battery, connectors, a chassis, and a display. In an additional embodiment, communication device 20 may include a remote connection to the transceiver antenna 22 and communication device 20 may exist as a line replaceable unit or slice in a communication suite.

Environment monitor 26 provides a characterization of the local environment at communication device 20. Environment characterization data is input to cognition application 28.

Environmental monitoring may include RF spectral characterization data, positional information including altitude, weather and/or atmospheric data, velocity information including relative velocity and the resulting Doppler shift, etc. Sensors providing the data may include an altimeter, a global positioning system, an inertial navigation device, a thermometer, a barometer, a speedometer, a tracking sensor such as a radar or an infrared sensor, etc. The physical location and speed of the device 20 may be determined to identify local spectrum usage constraints that may restrict the available SIS and/or MAC combinations assignable for a communication in that geographical location or for a relative velocity between the communicating devices. The environment monitor 26 senses the spectral environment by sampling of the available communication channels. Preferably, the environment monitor 26 is capable of wideband sampling of the spectral environment or a narrow sampling where the environment monitor 26 sweeps through the spectral environment. The monitoring identifies the occupancy of the spectrum that changes with time and geography as well as with the communication needs of surrounding communication devices. Thus, environment characterization data input to cognition application 28 includes spectral environment data, position, velocity, relative position, relative velocity, time, weather data, atmospheric data, bandwidth usage, etc.

Communication device 20 additionally may include a memory 42 and a processor 44. Memory 42 stores application 40, and the cognition application 28, in addition to other information. Device 20 may have one or more memory 42 that uses the same or a different memory technology. Memory technologies include, but are not limited to, random access memory, read only memory, flash memory, etc.

Processor 44 executes instructions that may be written using one or more programming language, scripting language, assembly language, etc. The instructions may be carried out by a special purpose computer, logic circuits, or hardware circuits. Thus, processor 44 may be implemented in hardware, firmware, software, or any combination of these methods. The term "execution" is the process of running an application or the carrying out of the operation called for by an instruction. Processor 44 executes application 40, cognition application 28, and/or other instructions. Device 20 may have one or more processor 44 that uses the same or a different processing technology. Additionally, processor 44 and memory 42 may be separate components of device 20 or may be embedded within another component of device 20. Cognition application 28 is an organized set of instructions that, when executed, cause device 20 to perform cognitive selection of the optimum SIS/MAC pair used for communication with other communication devices. Cognition application 28 may be written using one or more programming language, assembly language, scripting language, etc.

Communication device 20 communicates with other devices using the network 46. Devices in a network are connected by communication paths that may be wired or wireless. The network 46 may include both wired and wireless devices, such as satellites, cellular antennas, radios, computers, etc. The network 46 additionally may interconnect with other networks and contain sub-networks. A homogeneous network can be characterized by the type of access control transmission technology used. Access control transmission technologies implemented at the MAC sub-layer include CDMA, FDMA, TDMA, GSM, GPRS, CSMA, CSMA-CD, OFDM, Aloha, slotted Aloha, SPMA, Bluetooth, IEEE 802.11, and others as known to those skilled in the art both now and in the future. The network 46 may also be composed of heterogeneous devices using an assortment of access control transmission technologies.

Conventional RF technology employs continuous sine waves that are transmitted with data embedded in the modulation of the sine waves' amplitude or frequency. In general, transceiver antenna 22 receives an analog signal. An analog RF/IF filter filters the received analog signal from a transmission RF to an intermediate frequency (IF). An analog-to-digital converter converts the IF signal from an analog signal to a digital signal. A modem demodulates and otherwise processes the digital signal to extract the information that is sent up through the communication stack 24 to the application 40 for use. Similarly, in a reverse procedure, digital data received from the application 40 is sent down through the communication stack 24, is modulated by the modem, converted from a digital signal to an analog signal, filtered from IF to RF, and transmitted by transceiver antenna 22. In an alternative embodiment, the signal transmitted/received is digital and no conversion is required.

Communication device 20 transmits and receives data and/or voice information using communication stack 24 and cognition application 28 to determine and implement an optimum SIS/MAC pair for transmission/reception of a communication signal to/from another device. Each device uses hardware and/or software that provide CoDMAC capability. Cognition application 28 supports the selection of a single or of multiple SIS/MAC pairs based on current conditions at the communication devices in real-time or near-real-time.

Communication stack 24 may include a PHY layer 30, a network interface layer 32, an IP layer 34, a transport layer 36, and an applications layer 38. Various control messages are passed between the layers of communication stack 24 to transmit data from the application 40 to an application at another communication device. The data from application 40 is "handed down" to the lower layers in communication stack 24 for actual transmission to an application at another communication device. Received data is "handed up" communication stack 24 to the appropriate application at the other communication device.

Figure 2:
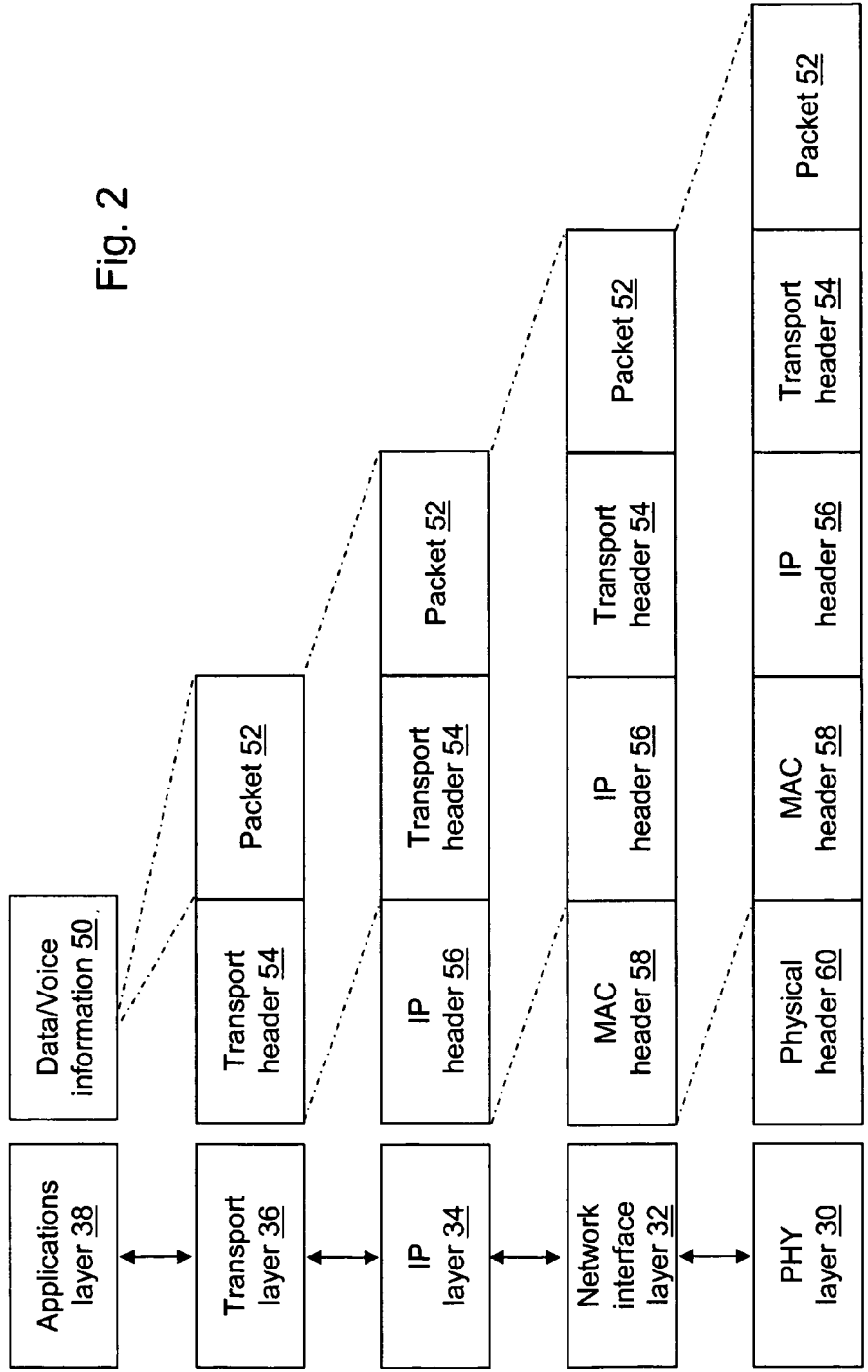
FIG. 2 is a block diagram of a communication stack utilizing packets in accordance with an exemplary embodiment.

With reference to FIG. 2, application 40 resides within applications layer 38, communicates data/voice information 50 to the transport layer 36. In general, transport layer 36 uses either TCP or UDP protocols in combination with IP to divide the data/voice information 50 into one or more packet 52 for efficient routing through the network 46. On reception, the TCP protocol in transport layer 36 reassembles the packets into the original data/voice information 50 sent to the applications layer 38. Alternatively, if the UDP protocol is used, the packet data is sent to the applications layer 38 to be reassembled by the receiving application.

Transport layer 36 prefixes a transport header 54 onto each packet 52 of the data/voice information 50 received from the applications layer 38. Transport header 54 includes the source and destination ports, and, if TCP is the transport protocol, the sequence number of the packet. IP layer 34 includes the source and destination IP addresses for each packet 52 in an IP header 56 so that it is received at the correct communication device. IP output packets or "datagrams" are prefixed with IP header 56. The IP protocol is used to route the packets from network to network. Each intervening device on the network 46 checks the destination IP address to see where next to forward the packet. Thus, the packet may be transmitted through communication devices or "multiple hops" before reaching the specified communication device. Routers contain routing tables that move the datagrams to the next "hop," which is either the destination device or another router. IP layer 34 hands over each datagram to network interface layer 32.

Network interface layer 32 generally is divided into two sub-layers: the LLC sub-layer and the MAC sub-layer. The LLC sub-layer controls frame synchronization, flow control, and error checking. The MAC sub-layer includes protocols that handle channel selection, channel access, and IP packet processing and controls how a device on the network 46 gains access to the data/voice information 50, acquires the data path, and controls the movement of bits over the data path. Network interface layer 32 handles the one hop routing and forwarding of the packet and encodes/decodes the datagram into bits forming a frame that includes a pre-fixed MAC header 58. MAC header 58 is composed of a MAC address, frame control, sequence control, duration information, and other fields. The MAC sub-layer protocols support methods of sharing the transmission medium among a number of devices and include CDMA, FDMA, TDMA, GSM, GPRS, CSMA, CSMA-CD, OFDM, Aloha, slotted Aloha, SPMA, Bluetooth, IEEE 802.11, etc. as known to those skilled in the art. The MAC sub-layer may be in the form of computer software, hardware, or both software and hardware. The MAC sub-layer interfaces directly with the PHY layer 30.

PHY layer 30 conveys the bit stream through the network 46 at the electrical and mechanical level. Thus, PHY layer 30 provides the hardware means of sending and receiving data on a carrier. The PHY layer may be in the form of computer software, hardware, or both software and hardware. PHY layer 30 sends information in the form of bits through the transceiver antenna 22, after adding a PHY header 60 to the network interface frame forming a physical packet. The modem modulates and demodulates the signal sent/received through the physical network media.

Cognition application 28 operates in conjunction with the network interface layer 32 which in turn provides a stable interface for IP layer 34 and for transport layer 36. Cognition application 28 supports reconfiguration of the PHY layer 30 and/or the MAC sub-layer while receiving characterization inputs from environment monitor 26 to optimize communication between communication devices in the network 46. Cognition application 28 selects the optimum SIS and/or MAC combination, and passes the SIS selection into PHY layer 30 using a first link 48 and the MAC selection into network interface layer 32 using a second link 49 while the user 40 communicates using standard IP network communication protocols over the network 46. Cognition application 28 operates at the applications layer 38.

Figure 3:
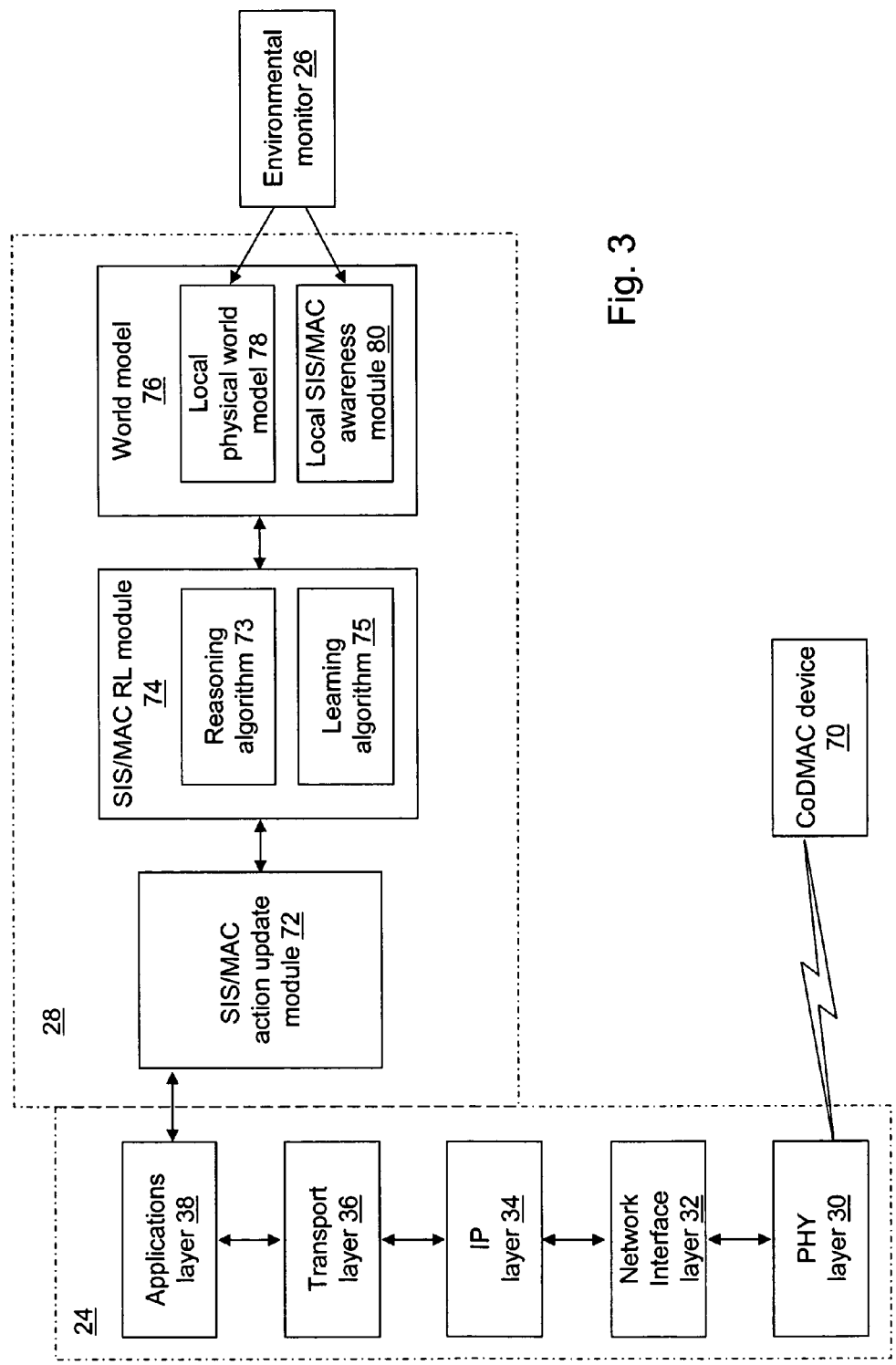
FIG. 3 is a block diagram illustrating exemplary functional blocks of a cognition application at the cognitive communication device.

With reference to FIG. 3, functional blocks of cognition application 28 are shown interacting with communication stack 24 and environment monitor 26. Communication device 20 is in communication with CoDMAC device 70. Cognition application 28 operates without interaction from the user. The functional blocks of cognition application 28 may include a SIS/MAC action update module 72, a SIS/MAC reasoning and learning (RL) module 74, and a world model 76.

World model 76 may include a local physical world model 78 and a local SIS/MAC awareness module 80. Input into world model 76 of cognition application 28 is performed by environment monitor 26 on a periodic and/or change driven basis. Environment monitor 26 provides the local RF spectrum, local subnet SIS/MAC awareness, and the physical location of communication device 20. Local physical world model 78 is kept active to continually provide input to cognition application 28. When an environment change occurs at a network node, cognition application 28 determines a system response. Behavioral characteristics of the current MAC environment are communicated up the communication stack 24 to the cognition application 28. Exemplary behavioral characteristics include, but are not limited to, data rate, latency, MER, range, bandwidth capacity, and channel behavior.

Cognitive processing is performed within SIS/MAC RL module 74 on a periodic or change driven basis. An update to world model 76 by a world representation algorithm triggers a response by SIS/MAC RL module 74 based on a changed environment. A learning algorithm 75 of SIS/MAC RL module 74 monitors world model 76 in addition to past network performance to identify the new frequencies and transmission modulation schemes available for combination and coordination through a channel access. Learning algorithm 75 may include one or more symbolic, probabilistic, and/or hybrid algorithm. Exemplary learning algorithms include abductive learning, abstraction, analogical learning, artificial neural networks, associative learning, Bayesian learning, decision trees, genetic algorithms, relational learning, statistical clustering, etc. A reasoning algorithm 73 of SIS/MAC RL module 74 selects the optimum transmission parameters. Reasoning algorithm 73 may include one or more symbolic, probabilistic, and/or hybrid algorithm. Exemplary learning algorithms include first order reasoning, abductive reasoning, analogical reasoning, Bayesian networks, case based reasoning, integrated case based reasoning, fuzzy reasoning, neural networks, rule-based expert systems, search-based optimization, schema-based scripting, causal reasoning, pattern extrapolation, pattern matching, counterfactual reasoning, forward and backward chaining, game-theory optimization, logical unification, Markov processes, model based reasoning, quantitative simulation, etc. From the identified SIS/MAC combination, the most attractive protocol tying together the available SIS/MAC is selected using reasoning algorithm 73.

The selection process includes inputs from world model 76 and considers usable frequency sources, similar source categorization, adaptation to these stimuli, current bandwidth requirements, and implementation of a goal based response derived from weighted variables. The solution space includes five dimensions: 1) channel selection, 2) latitude, 3) longitude, 4) altitude, and 5) time because frequency sources exist relative to a physical location. Time enters the solution space due to the nature of source emitters. Some emitters may exist on a 24 hour basis, while others may operate on an intermittent or scheduled basis. Therefore, a priori information on source emitters is included with world model 76. A predictive capability with respect to the lifetime of frequency sources is also included. The predictive capability includes two operational environments: peace time and war time. Frequency sources may be removed during war time, and operational profiles generally change for any remaining frequency sources during war time. Thus, SIS/MAC RL module 74 is spectrum aware, location aware, and schedule aware.

After a solution is obtained for a potential SIS and/or MAC combination, the solution is sent to SIS/MAC action update module 72. SIS/MAC action update module 72 communicates the requested change in SIS and/or MAC combination to CoDMAC device 70 through communication stack 24. CoDMAC device 70 determines if there is a conflict based on the requested SIS and/or MAC combination change. If no conflict is determined, CoDMAC device 70 approves the change in SIS and/or MAC combination by sending an approval message to SIS/MAC action update module 72 through communication stack 24. Thus, the SIS and/or MAC combination change is coordinated between communication device 20 and CoDMAC device 70, thereby enhancing network wide performance.

After receiving the approval message from CoDMAC device 70, SIS/MAC action update module 72 implements the SIS/MAC changes and passes these changes to SIS/MAC RL module 74. SIS/MAC RL module 74 records the change in SIS/MAC approach to memory 42. Through this process, communication device 20 learns from a successful recommendation cycle. If the requested SIS and/or MAC combination is rejected by CoDMAC device 70, SIS/MAC RL module 74 similarly learns. The learned response is used with an updated world model so SIS/MAC RL module 74 can achieve higher acceptance rates in the future. Thus, once a solution is obtained and accepted, it is stored to support rapid decision making for future cases of a similar nature. This provides an increase in network throughput by reducing the processing time.

Figure 4:
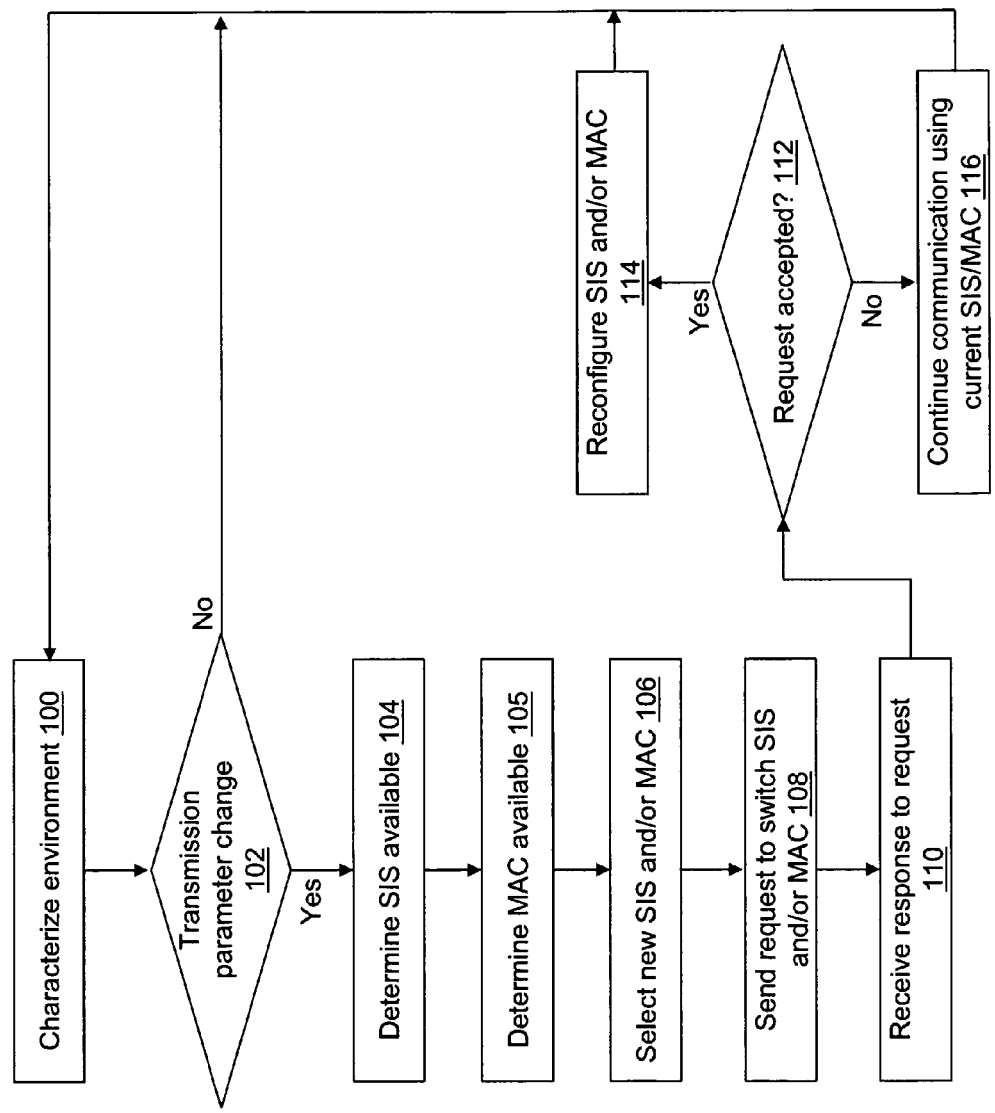
FIG. 4 is a flow diagram illustrating exemplary operations performed at the cognitive communication device in accordance with an exemplary embodiment.

With reference to FIG. 4, exemplary operations performed at communication device 20 are described. Communication device 20, for example, is in communication with CoDMAC device 70 using a clandestine network. Cognition application 28 of communication device 20 characterizes the environment in an operation 100 using environment characterization data received from environment monitor 26. Cognition application 28, in an operation 102, determines if a change in transmission parameter is needed. For example, a transmission parameter may need modification to respond to a changing operational environment. For example, cognition application 28 may predict a need to change the transmission parameter to avoid a communication signal loss resulting from a high Doppler shift or a high relative velocity as communication device 20 moves with respect to device 70. The spectral environment may change based on geographical location changes, time changes, or a changed transmission environment due, for example, to clutter. Bandwidth utilization may change based on changing communication requirements. A transmission parameter includes a frequency, a bandwidth, and/or a parameter associated with a transmission technology. Transmission technologies include CDMA, FDMA, TDMA, GSM, GPRS, CSMA, CSMA-CD, OFDM, Aloha, slotted Aloha, SPMA, Bluetooth, IEEE 802.11, etc.

If no change is needed, processing continues at operation 100. If a change is needed, processing continues at an operation 102. For example, cognition application 28 may determine that additional bandwidth capacity is needed to support current communication requirements. To address this need, cognition application 28 of communication device 20 determines the SIS available for transmission in operation 104. For example, communication device 20 finds a broadcast on TV channel 5. Cognition application 28 of communication device 20 determines the MAC available for transmission in an operation 105. For example, communication device 20 determines that the upside of TV channel 5 is available within the clandestine network. TV channel 5 is being broadcast in the region and no clandestine traffic is occurring on the upside of TV channel 5. Cognition application 28 selects a new SIS and/or MAC combination in an operation 106. For example, communication device selects a SIS/MAC combination associated with use of the upside of TV channel 5. Cognition application 28 sends a request to switch to the new SIS and MAC combination in an operation 108. For example, communication device sends a request to CoDMAC device 70 on an existing link between the two devices requesting a switch to the upside of TV channel 5. The request includes an indication of the selected new SIS and/or MAC combination or a transmission parameter associated with the selected new SIS and/or MAC combination. For example, the indication may be a numerical flag indicating the SIS/MAC combination selected based on a common list maintained at each communication device 20. Other indicators of a selection may be used as known to those skilled in the art.

Cognition application 28 of CoDMAC device 70 accepts or rejects use of the upside of TV channel 5 and sends a response including this information to communication device 20 on the existing link. Cognition application 28 of communication device 20 receives a response through communication stack 24 to the request in an operation 110. An operation 112 includes a determination of whether the request is accepted. If the response includes acceptance of the request, i.e. to switch to the upside of TV channel 5, communication device 20 reconfigures its SIS/MAC to link on the upside of TV channel 5 in an operation 114. CoDMAC device 70 similarly reconfigures its SIS/MAC combination. The two devices begin communicating using these link parameters. If the response includes rejection of the request, communication device 20 continues communication through the existing link in an operation 116. Altering only the SIS may occur by agreement between the devices. Through utilization of the unused frequency, the network bandwidth capacity for the network is increased without impacting frequencies currently used in that location. The transmission change is transparent to IP layer 34 and transport layer 36, and no user input is required.

In another embodiment, communication device 20 may agree to send on the upside of TV channel 5 and agree for communication device 70 to send on the downside of TV channel 5 or some other TV channel. Such coordinated utilization, maximizes bandwidth usage and minimizes traffic collisions and the slowing of communication traffic. Communication device 20 may send a "request to send" control signal to request permission to transmit using the desired transmission characteristics. Communication device 20 may send a "clear to send" control signal to request that communication device 70 transmit using the desired transmission characteristics. Any other collision avoidance mechanism such as TDMA can also be used to coordinate transmissions between communication devices.

Figure 5:
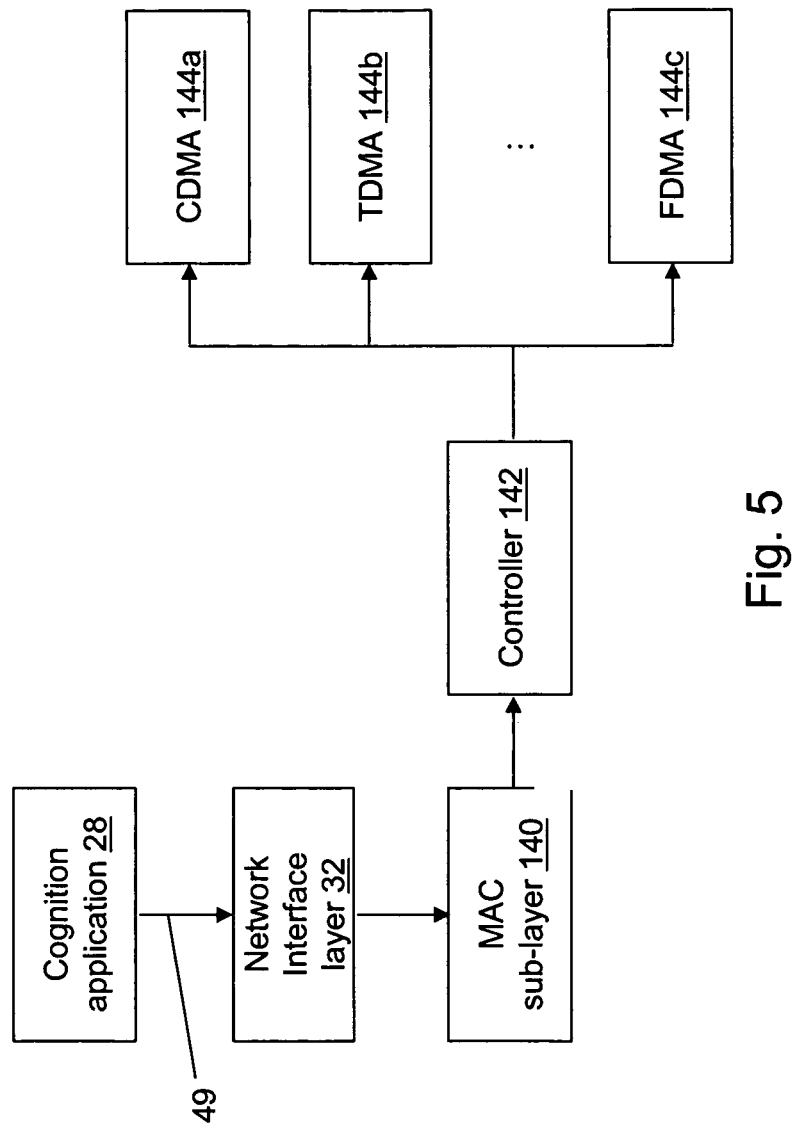
FIG. 5 is a block diagram illustrating exemplary functional blocks reconfiguring a MAC sub-layer at the cognitive communication device.

With reference to FIG. 5, exemplary functional blocks to reconfigure a MAC sub-layer 140 are shown. As discussed with reference to FIG. 1, cognition application 28 selects the optimum SIS and/or MAC combination and passes the SIS selection into PHY layer 30 using a first link 48 for a CoDMAC implementation and passes the MAC selection into network interface layer 32 using a second link 49 for a CoMAC or CoDMAC implementation. Network interface layer 32 includes MAC sub-layer 140. MAC sub-layer 140 may include a controller 142 that controls the switching of the MAC based on the MAC selection received from cognition application 28 or reconfigures the current MAC based on the MAC parameters received from cognition application 28. Controller 142 may be implemented using a special purpose computer, logic circuits, hardware circuits, etc. Thus, controller 142 may be implemented in hardware, firmware, software, or any combination of these methods. Controller 142 selects the appropriate MAC based on the MAC selection. For example, controller 142 may select CDMA 144*a*, TDMA 144*b*, FDMA 144*c*, etc. based on the MAC selection received from cognition application 28. In a similar manner, the PHY layer 30 can be reconfigured based on the received SIS selection.

Cognition application 28 thus forms a cognitive engine to control radio performance and to manage bandwidth in a low probability of exploitation environment (LPE). In an LPE environment, it is important to make a communications choice that is not catastrophic to the user. For example, a selection to emit a high power, and thus highly detectable signal in an open band next to an enemy intercept receiver should not occur. Thus, a proper choice of waveforms, power levels, and operational frequency bands should include the feedback loop between devices that each have an intelligent view of their operational environment. Cognition application 28 provides for multiple group votes concerning the environment to enable the most intelligent choice for SIS/MAC operation allowing for near-optimum spectral hiding and snuggling. The feedback enables improved identification and isolation of emission sources external to the network.

LPE performance is driven from both ends of the communications link. At the emitter end, an LPE choice should be made that provides the best spectral environment to hide. From the receive end, the receiver sensitivity and performance is critical to the output power required to close the communications link. Proper choice from both ends of the link enables the smallest emitted power to be used in addition to the best choice for environmental masking of the emissions. Feedback mechanisms also allow for the participating communication devices to utilize fine power control and to adjust their transmissions to the minimum level required to close the link. Feedback knowledge of environmental effects such as interference, propagation loss, fading, ducting, foliage absorption, etc. can be used in future transmissions between communication devices to adjust transmission powers to the proper level as conditions change.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. For example, the cognition application may include fewer, additional, or different modules than described without deviating from the spirit of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of reconfiguring communication transmission characteristics in response to a changing communication environment, the method comprising:

receiving a communication signal from a first communication device at a second communication device, the communication signal being processed based on a first SIS/MAC transmission pair, wherein the first SIS/MAC transmission pair having a SIS parameter associated with processing of the communication signal by a physical layer implemented at the second communication device and a MAC parameter associated with processing of the communication signal at a network interface layer implemented at the second communication device, wherein the first SIS/MAC pair is selected using a world model, the world model including world model data for a local environment, the world model data including a source emitter schedule, the source emitter schedule including predictive information on source emitter operation, the predictive information including peace time and war time operational profiles;

sensing a local environment at the second communication device to obtain environment characterization data, the environment characterization data including a location;

identifying if there is a need to change the first SIS/MAC pair;

if a need is identified, selecting a second transmission SIS/MAC pair different from the first SIS/MAC pair based on the environment characterization data, wherein the selecting uses a solution space including a channel selection dimension, a latitude dimension, a longitude dimension, an altitude dimension and a time dimension, the time dimension being used to select frequency and modulation schemes based upon the source emitter schedule; and sending a request to the first communication device from the second communication device, wherein the request includes an indication of the selected second SIS/MAC pair.

2. The method of claim 1, wherein the network interface layer includes a media access control sub-layer, and further wherein the MAC parameter is associated with a transmission technology supported at the media access control sub-layer.

3. The method of claim 1, wherein the SIS-parameter is selected from the group consisting of a frequency, a bandwidth, and a parameter associated with a transmission technology.

4. The method of claim 1, further comprising reconfiguring at least one of the physical layer and the network interface layer at the second communication device based on the second transmission SIS/MAC pair.

5. The method of claim 1, wherein the physical layer and the network interface layer are separately reconfigurable.

6. The method of claim 1, wherein the physical layer can be reconfigured without reconfiguring the network interface layer.

7. The method of claim 1, wherein the physical layer and the network interface layer are reconfigured as a pair.

8. The method of claim 1, wherein the need is identified based on a bandwidth usage.

9. The method of claim 1, wherein the need is identified based on a spectral environment change.

10. The method of claim 1, further comprising identifying new transmission frequencies and modulation schemes available for use in a second SIS/MAC in response to an update to the world model.

11. The method of claim 1, wherein the spectral environment change results from a time change.

12. The method of claim 1, wherein the spectral environment change results from an environment change.

13. The method of claim 1, wherein the need is identified based on an operational environment change.

14. The method of claim 1, wherein the operational environment change is a change in a relative velocity between the first communication device and the second communication device.

15. The method of claim 1, wherein sensing the local environment includes sampling of a frequency spectrum of a communication channel.

16. The method of claim 1, wherein an input to a cognitive algorithm includes an environment characterization datum associated with sensing the local environment, the cognitive algorithm accessing the world model and selecting the second SIS/MAC pair.

17. A non-transitory computer-readable medium having computer-readable instructions stored thereon that, upon execution by a processor, cause the processor to reconfigure communication transmission characteristics in response to a changing communication environment using steps comprising:

characterizing an environment, to obtain environment characterization data, the environment characterization data including at least one of weather data and atmospheric data;

identifying if there is a need to change a first transmission parameter, wherein the first transmission parameter is associated with processing of a communication signal received from a communication device by at least one of a physical layer and a network interface layer;

if a need is identified, selecting a second transmission parameter different from the first transmission parameter based on the environment characterization data, wherein the selecting uses a world model including a source emitter schedule, the source emitter schedule based on a priori information rather than empirical observation, the information regarding times of operation and non-operation for a source emitter; and sending a request to the communication device, wherein the request includes an indication of the selected second transmission parameter.

18. A communication device, the communication device comprising:

a receiver, the receiver receiving a communication signal from a first communication device, the communication signal processed based on a first SIS/MAC combination, wherein the first SIS/MAC combination including a first SIS parameter associated with processing of the communication signal by a physical layer and a first MAC parameter associated with processing of the communication signal associated with a network interface layer, the physical layer and the network interface layer operatively connected with the receiver;

an environment monitor, wherein the environment monitor senses the environment to obtain environment characterization data;

a non-transitory computer-readable medium having computer-readable instructions stored thereon, the instructions comprising identifying if there is a need to change the first transmission SIS/MAC combination;

if a need is identified, selecting a second SIS/MAC combination different from the first SIS/MAC combination based on the environment characterization data, the second SIS/MAC combination being selected from a predetermined list of SIS/MAC combinations, the selecting using a latitude, longitude, a channel, and a time parameter and a world model including a source emitter schedule with advance information for source emitters operating on a scheduled basis, the source emitter schedule including a war time schedule and a peace time schedule.

19. The method of claim 18, wherein sensing the local environment comprises sensing a position or a velocity of the first communication device or the second communication device.

20. The method of claim 18, wherein sensing the local environment comprises sensing atmospheric data at the second communication device.

\* \* \* \* \*